United States Patent
Nieto et al.

(10) Patent No.: US 7,292,640 B2
(45) Date of Patent: Nov. 6, 2007

(54) SYSTEM AND METHOD FOR AN ADAPTIVE RECEIVER FOR THE RECEPTION OF SIGNALS SUBJECT TO MULTIPATH INTERFERENCE

(75) Inventors: John Wesley Nieto, Rochester, NY (US); William Nelson Furman, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 852 days.

(21) Appl. No.: 10/677,271

(22) Filed: Oct. 3, 2003

(65) Prior Publication Data
US 2005/0074067 A1    Apr. 7, 2005

(51) Int. Cl.
*H04K 1/00* (2006.01)
*H04J 11/00* (2006.01)
(52) U.S. Cl. ........................................ 375/260; 370/210
(58) Field of Classification Search ................ 375/144, 375/148, 260, 348; 370/206, 208, 210
See application file for complete search history.

(56) References Cited

U.S. PATENT DOCUMENTS

| | | | |
|---|---|---|---|
| 6,115,354 A * | 9/2000 | Weck | 370/203 |
| 6,804,312 B1 * | 10/2004 | Win et al. | 375/347 |
| 2003/0117943 A1 * | 6/2003 | Sakata et al. | 370/210 |
| 2005/0101264 A1 * | 5/2005 | Farlow et al. | 455/84 |

* cited by examiner

*Primary Examiner*—Young T. Tse
(74) *Attorney, Agent, or Firm*—Duane Morris LLP (57) ABSTRACT

Disclosed is an inventive system and method for extracting signal energy from the guard time portion of a communication frame based on the amount of multipath interference experienced by that communication frame. In one embodiment, N blocks of samples are created from the received frame wherein the samples in the guard time portion of the received frame are included in one of more of the N blocks of samples. The estimated symbols, or estimated bits, determined from the received samples are checked for corruption due to multipath interference. For those blocks for which multipath interference is not detected, the estimated symbols, or estimated bits, are coherently added together so as to take advantage of uncorrupted signal energy from the guard time portion of the frame.

53 Claims, 7 Drawing Sheets

PRIOR ART

SYSTEM AND METHOD FOR AN ADAPTIVE RECEIVER FOR THE RECEPTION OF SIGNALS SUBJECT TO MULTIPATH INTERFERENCE

BACKGROUND OF THE INVENTION

Many wired and wireless communication systems, e.g. HF, VHF, UHF, radio, etc. operate over communication channels that experience one or more delayed versions of the transmitted waveform at the receiver, a condition known as multipath. Multipath channels degrade the signal quality of the transmitted channel by introducing distortion and/or interference, such as intersymbol interference, in the receiver thereby creating problems with acquiring, demodulating, decoding, and/or accurately extracting the data bits contained in the transmitted signal. This applies to, among other signals, orthogonal frequency division multiplexed ("OFDM") signals, such as signals defined by U.S. MIL-STD-188-110B Appendix B.

As is known in the art, multipath interference occurs when one radio signal is sent and multiple signals are received at the receiver. The first signal received is the one that travels directly from the transmitter to the receiver, known as the direct path signal. The other signals that are received are delayed versions of the direct path signal and are known in the art as the multipath signals. Typically, the multipath signals may be received a considerable time after the reception of the direct path signal. The multipath signals are typically due to reflection of the transmitted signal by obstacles such as mountains, buildings, trees, weather phenomena, etc. Since the overall path of the reflected signal is longer than the direct path, at the receiver the multipath signals appear to be delayed in time with respect to the direct path signal.

The prior art discloses the use of guard time to overcome the distortion caused by multipath effects. Guard time, as is known in the art, is typically that part of a transmission, for example the first and/or last portions of a communication frame, which is discarded by the receiver as it is assumed to be corrupted by, among other things, multipath interference. The communication frame is therefore divided into a payload portion containing useful data bit energy and a guard time portion which may or may not contain useful data bit energy. Typical prior art receivers do not make use of the energy that is transmitted in the guard time portion of the signal. In some prior art systems, as much as twenty percent of a communication frame is dedicated to guard time which significantly reduces the transmission efficiency of the system.

Since the effects that cause multipath interference are not always constant in time, the amount of guard time required for one communication frame may be different than the amount of guard time required for a different communication frame. However, some typical prior art receivers do not allow for adaptation of the amount of guard time in a communication frame and blindly discard the guard time symbol energy.

Typically, the portion of a frame dedicated to guard time in prior art systems is determined by the largest amount of multipath interference the system is expected to encounter. This amount usually remains constant from frame to frame. For example, if a communication frame 20 msec long is expected to experience a maximum multipath interference of 4 ms, then the first (or last) 4 msec of the communication frame would be designated as guard time and the receiver would not process any energy during that period of time.

Some prior art systems fill the guard time portion of the communication frame with a set of duplicate samples from the payload portion of the frame. This is known as creating guard time by cyclic extension. In these systems, there may be useful energy in the samples in the guard time portion of the communication frame that is not currently being used advantageously by prior art receivers.

Hence, there is a need in the industry for a receiver that is able to determine the amount of multipath interference the communication system is currently experiencing, and advantageously use the signal energy in the guard time portion of the communication frame.

It is therefore an object of the disclosure to provide a novel method for providing data bits from a received signal including frames containing symbols which were transmitted through a channel subject to multipath interference, where the received time domain samples are partitioned into frames; N blocks of received samples are created from a frame; estimated symbols are determined from the received samples; multipath corruption is detected for each block; and for those blocks for which multipath corruption is not detected, the estimated symbols or soft decision bits are coherently combined to thereby provide more reliable data bits.

It is a further object of the disclosure to provide a novel method for processing a received communication frame. For example, in an embodiment, a received communication frame may be processed into N blocks of K samples of which J samples are the guard time portion of the frame where the first of the N blocks contains the first K samples of the frame and the remaining N−1 blocks contain K samples whereby the first sample of each block is offset from the first sample of the previous block by J/N samples.

It is still a further object of the disclosure to provide a novel receiver including means for providing data bits from a received signal including frames containing samples which were transmitted through a channel subject to multipath interference, means for partitioning the received signal into frames; means for creating N blocks of received time domain samples from a frame; means for determining estimated symbols or bit soft decisions from the received blocks; means for determining multipath corruption in the estimated symbols or soft decision bits; means for coherently combining estimated symbols or soft decision bits for those blocks for which multipath corruption is not detected to thereby provide the data bits.

It is yet a further object of the disclosure to provide a novel system for communicating data bits over a channel subject to multipath interference comprising a transmitter for creating communication frames including a payload portion and a guard time portion wherein the samples in the guard time portion are copies of samples in the payload portion, and transmitting the frames; and a receiver for receiving the frames and determining the data bits from estimated symbols or soft decision bits derived from received samples in the payload portion and at least a part of the guard time portion to thereby communicate the data bits.

It is another object of the disclosure to provide a novel system and method for communicating data bits in an orthogonal frequency division multiplexed signal over a channel subject to multipath interference where the receiver creates subsets of the time domain samples in a received frame, determines the estimated symbols or soft decision bits from the received samples, determines which subsets include estimated symbols or bit soft decisions that are corrupted by multipath interference, and coherently adds the energy of the received symbols or bit soft decisions from the subsets which are not corrupted by multipath interference.

These and many other objects and advantages of the present disclosure will be readily apparent to one skilled in the art to which the disclosure pertains from a perusal of the claims, the appended drawings, and the following detailed description of the preferred embodiments.

DETAILED DESCRIPTION

Disclosed is an inventive system and method for extracting signal energy from the guard time portion of a communication frame based on the amount of multipath interference experienced by that communication frame. In one embodiment, N blocks of time domain samples are created from the received frame wherein the samples in the guard time portion of the received frame are included in one of more of the N blocks of samples. The estimated symbols, or estimated bits, determined from the received samples are checked for corruption due to multipath interference. For those blocks for which multipath interference is not detected, the estimated symbols, or estimated bits, are coherently added together so as to take advantage of uncorrupted signal energy from the guard time portion of the frame.

While the discussion below refers to OFDM signals, it shall be understood by those of skill in the art that the inventive system and method can be applied to signals other than OFDM signals by using obvious variations to the disclosed system and method.

Figure 1:
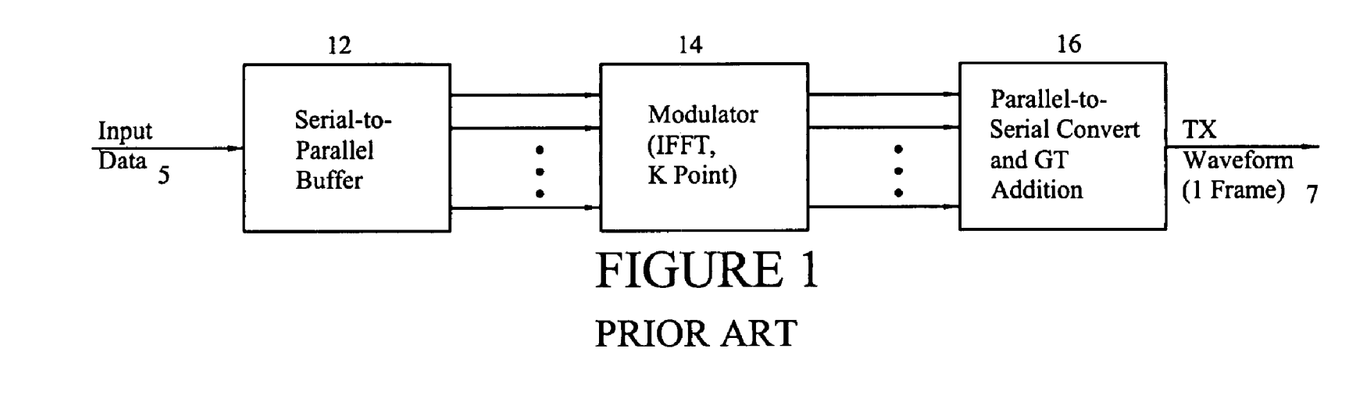
FIG. 1 is a high level block diagram of a prior art transmitter.

Referring now to FIG. 1, a high level block diagram of a prior art transmitter is depicted. The input data 5, which can be either coded or uncoded bits, is applied to the serial-to-parallel converter 12 where the serial data is buffered M bits at a time where M is the number of data bits per frame to be transmitted. For an OFDM transmitter, M is the number of data bits per OFDM frame. The output from the converter 12 is applied to the modulator 14. For an OFDM transmitter, the M bits modulate each OFDM tone according to the desired modulation scheme for each tone (e.g., for 2-PSK, 1 bit per tone, for 4-PSK, 2 bits per tone, etc.) An Inverse Fast Fourier Transform ("IFFT") is applied to the block of K tones, where a bin in the IFFT represents one of the K possible orthogonal tones in the OFDM signal. The output from the modulator 14 is applied to the parallel-to-serial converter 16 where the parallel signals are serialized and the result of the IFFT is cyclically extended to create guard time ("GT") for the OFDM frame. The OFDM frame is of length K+GT samples. The OFDM frame is then transmitted as the TX waveform 7.

As a non-limiting example, for a 39-tone waveform, IFFT of size K=128 points, with input data at 2400 bits per second, the waveform will have 78 bits per frame. The 78 bits are used to modulate 39 tones of the possible 128 tones (128 point IFFT and differential quadrature phase shift keying ("DQPSK") on each tone). The IFFT operation results in an array containing K=128 samples. The first 34 samples are repeated and appended onto the 128 samples (i.e., cyclic extension to create GT), and the resulting 162 samples are transmitted at 7200 samples per second.

Figure 2:
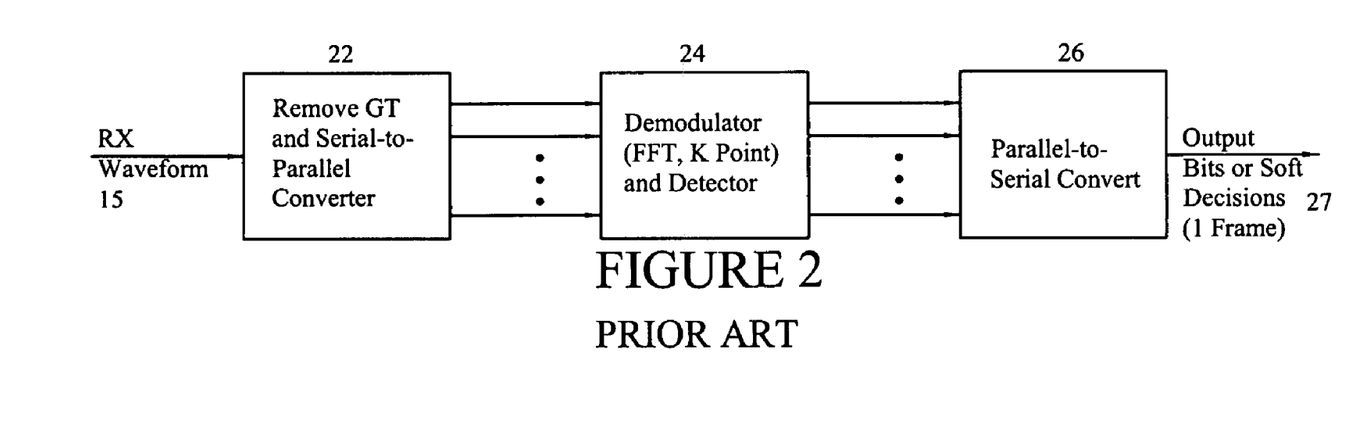
FIG. 2 is a high level block diagram of a prior art receiver.

With reference now to FIG. 2, a high level block diagram of a prior art receiver is depicted. The RX waveform 15 is received by the receiver and applied to the serial-to-parallel converter 22 where (continuing the above example) the serial stream is converted into 39 parallel streams and the 34 samples of guard time are removed from each frame. As is known in the art, OFDM frame synchronization allows for appropriate start and end locations for the frame. The output of the converter 22 is applied to the demodulator 24 where, for each frame, a Fast Fourier Transform ("FFT") is performed on the remaining 128 samples in the frame to detect the 39 tones. Either estimated symbols or estimated bits are output from the demodulator 24 and applied to the parallel-to-serial converter 26 where the estimated symbols/bits are serialized and output as the signal 27.

Figure 3:
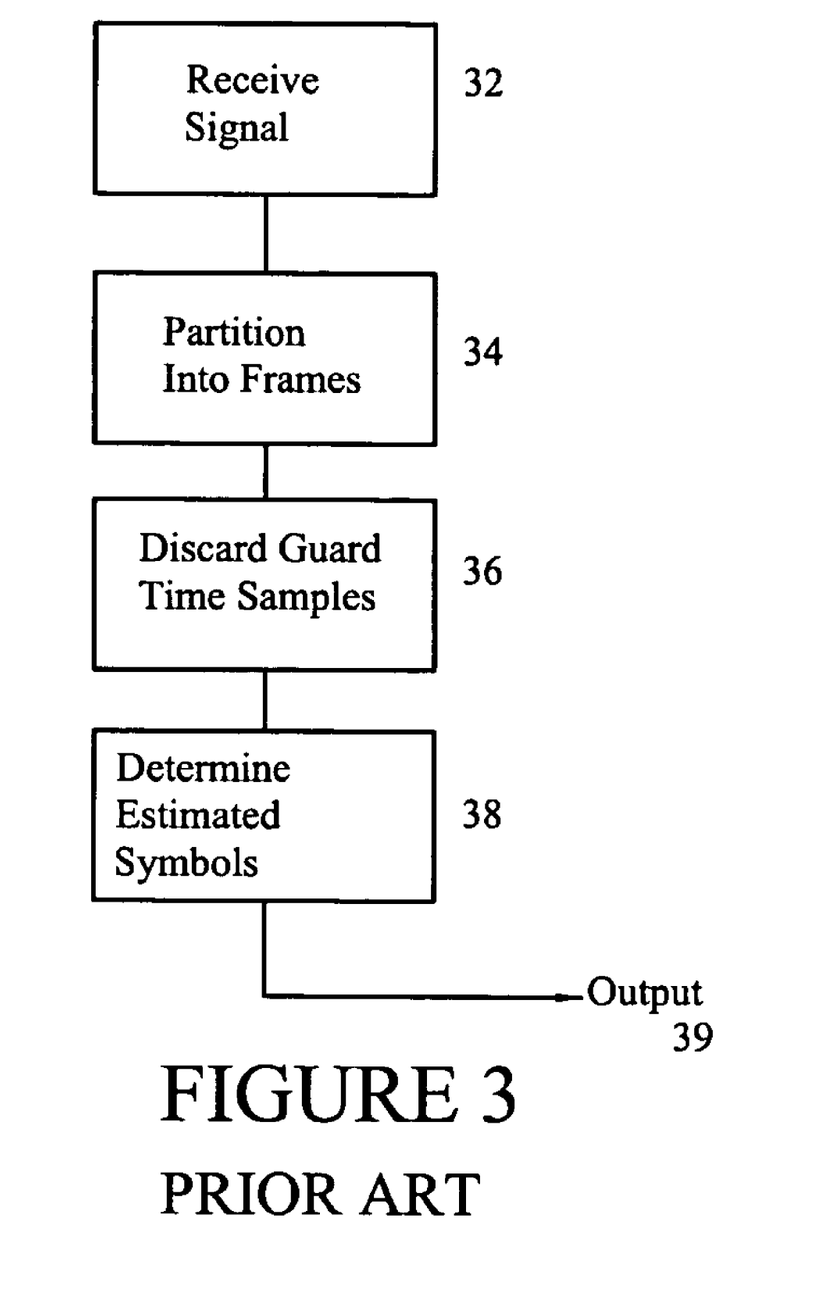
FIG. 3 is a flow chart of the major steps performed by a prior art receiver.

With reference now to FIG. 3, a flow chart of the major steps performed by a prior art receiver will be described. The receiver receives a signal at block 32, partitions the received signal into frames at block 34, discards the guard time samples at block 36, determines the estimated symbols or bits at block 38 and outputs the resultant signal 39.

Figure 4:
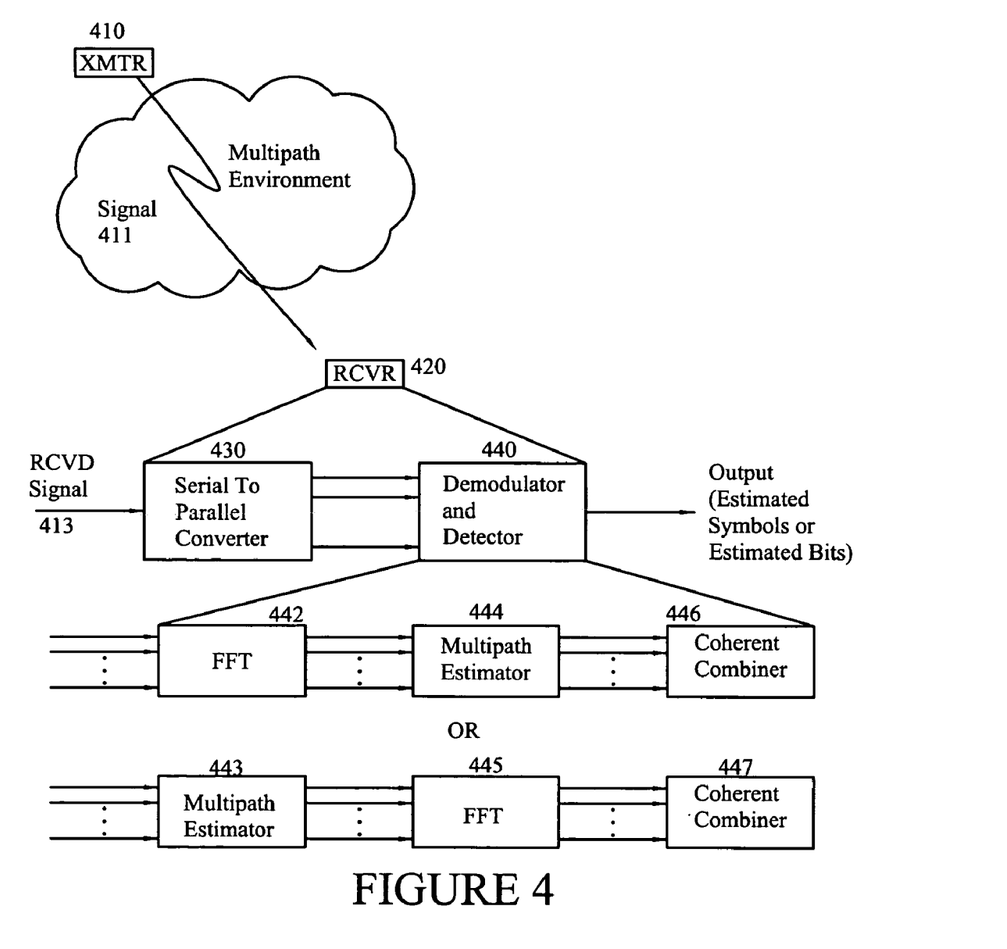
FIG. 4 is a high level block diagram of a receiver according to the present disclosure.

With attention now drawn to FIG. 4, an embodiment of the present invention will now be described. FIG. 4 is a high level block diagram of a receiver according to the present disclosure. A transmitter 410, such as the transmitter described above in FIG. 1 transmits the signal 411 to the receiver 420 through a channel subject to multipath interference. The received signal 413 is applied to the serial-to-parallel converter 430 which separates the received signal into parallel streams. Continuing with the example above, the received signal 413 is an OFDM signal and the converter 430 separates the received signal into the 39 tones. However, unlike the prior art receiver in FIG. 2, the guard time (34 samples from the above example) is not removed from the frames. Therefore, the frames contain 162 samples (for the continuing example). The output of the converter 430 is applied to the demodulator and detector 440 where estimated symbols or bits will be determined using the signal energy in the 128 samples in the frame and, as will be seen below, the signal energy in none, some, or all of the 34 samples in the guard time.

In one embodiment, the demodulator and detector 440 comprises the FFT 442, the multipath estimator 444 and the coherent combiner 446. In another embodiment, the demodulator and detector 440 comprises the multipath estimator 443, the FFT 445 and the coherent combiner 447. This latter embodiment is particularly useful in reducing the amount of computation required in the FFT 445 by eliminating the blocks of samples that are corrupted by multipath interference prior to being operated on by the FFT 445. One of skill in the art will note that the latter embodiment will require an FFT that is at least twice the size of the original FFT. Furthermore, those of skill in the art will understand that advantage should be taken of the periodicity principle of FFTs and proper selection of payload samples plus guard time samples that are not disturbed by multipath effects to thereby create a cyclically extended version of the signal in order to fit the signal into the new (i.e., larger-sized) FFT. One of skill in the art will also note that the FFT domain tones may have been moved to different locations in FFT based on FFT size and the current, unchanged sample rate. The discussion below is directed toward the former embodiment although those of skill in the art will readily see how the discussion applies to the later embodiment as well.

Figure 5:
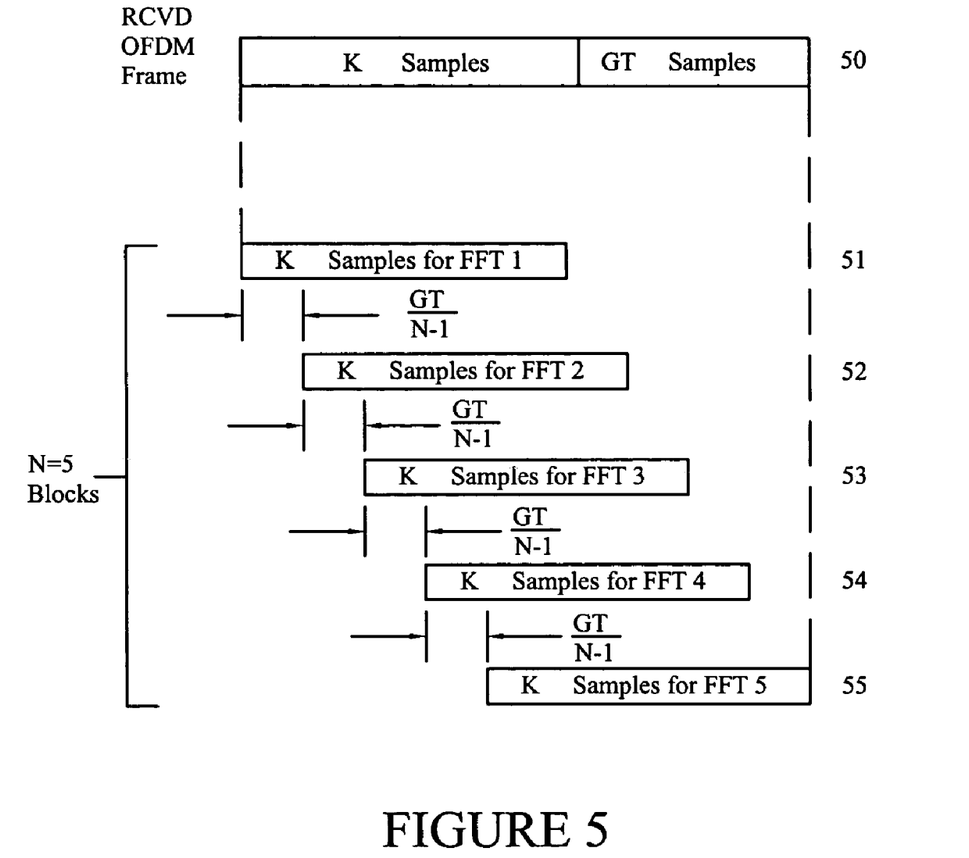
FIG. 5 is a flow chart of the major steps performed by a receiver according to the present disclosure.

Reference is now directed towards FIG. 5, which is a depiction of N blocks of samples derived from a received frame including a payload portion (128 samples for the continuing example) and a guard time portion (34 samples for the continuing example) according to the present inventive system and method. In FIG. 5, N=5. It shall be understood by those of skill in the art that N is not limited to 5 and typically will be a function of the size of the FFT in FFT 442 as well as the partitioning of the OFDM frame that the user selects. It shall further be understood by those of skill in the art that the partitioning of the OFDM frame need not be uniformly distributed (i.e., need not have the same offset from the previous block of samples) as shown in FIG. 5 but rather the partitioning can be non-uniform. For example, if one sets N=4, one would then have 4 FFTs which could be, for example, FFT1, FFT2, FFT3, and FFT5 shown in FIG. 5. Likewise, for example, the partitioning of the OFDM frame could be such that some, or all, of the blocks of samples have different offsets from the respective preceding block of samples. The following discussion references FIG. 5 which depicts a uniform offset between successive blocks of samples. However, those of skill in the art will readily see how the discussion applies to non-uniform offsets as described above.

As is shown in FIG. 5, block 50 depicts a received OFDM frame comprising K samples of payload and GT samples of guard time. It will be recalled that the guard time is a cyclic extension of the IFFT in the transmitter 410 and is appended to the K samples. Therefore, useful signal energy may be extracted from the samples in the guard time portion of the received frame, which is an object of the disclosure. Restating, the present inventive system and method seeks to take advantage of the energy in the guard time samples that are not corrupted by multipath interference. Instead of processing only the payload portion of the received frame as is done in the prior art, the inventive system and method creates N blocks of samples from the received frame, the first of which may be aligned with the beginning of the frame and the remainder offset from the previous block by an amount equal to the number of samples in the guard time divided by the number of blocks to be created minus one: GT/(N−1). Each of the N blocks will be processed through the FFT to thereby determine symbol estimates or symbol bits (i.e., soft decisions or bits).

With continuing reference to FIG. 5 for the present example, the block 50 is the received frame and N=5 blocks are to be created therefrom. The block of samples 51 is comprised of the first K samples of the received frame. The block of samples 52 is comprised of K samples where the first sample of block 52 is offset GT/4 samples from the first sample in the block 51, where GT is the number of samples in the guard time of the frame and 4 is one less than the number of blocks to be created (i.e., N−1=4). Likewise, the block of samples 53 is comprised of K samples where the first sample of the block 53 is offset GT/4 samples from the first sample in the block 52 (in other words, offset GT/2 samples from the block 51 and from the first sample in the frame). Similarly, the block of samples 54 is comprised of K samples where the first sample of the block 54 is offset GT/4 samples from the first sample in the block 53. The block of samples 55 is comprised of K samples where the first sample of the block 55 is offset GT/4 samples from the first sample of the block 54. The last sample of the block 55 is the last sample of the received frame 50.

With renewed reference to FIG. 4, the FFT 442 performs the above-described function of creating N blocks of samples and then performs an FFT on each of the N blocks of samples to thereby determine estimated symbols or bit soft decisions. The estimated symbols or bits for each of the N blocks are then applied to the multipath estimator 444 to determine which, if any, of the estimated symbols (or estimated bits) in the N blocks is corrupted by multipath interference, as is known in the art. For those N blocks for which no estimated samples were corrupted, the estimated symbols or bits are coherently combined in the coherent combiner 446 by methods known in the art. The combiner 446 outputs the combined estimated symbols or bits. In this way, energy in the guard time samples that are not corrupted by multipath interference is advantageously used by the receiver.

Figure 6:
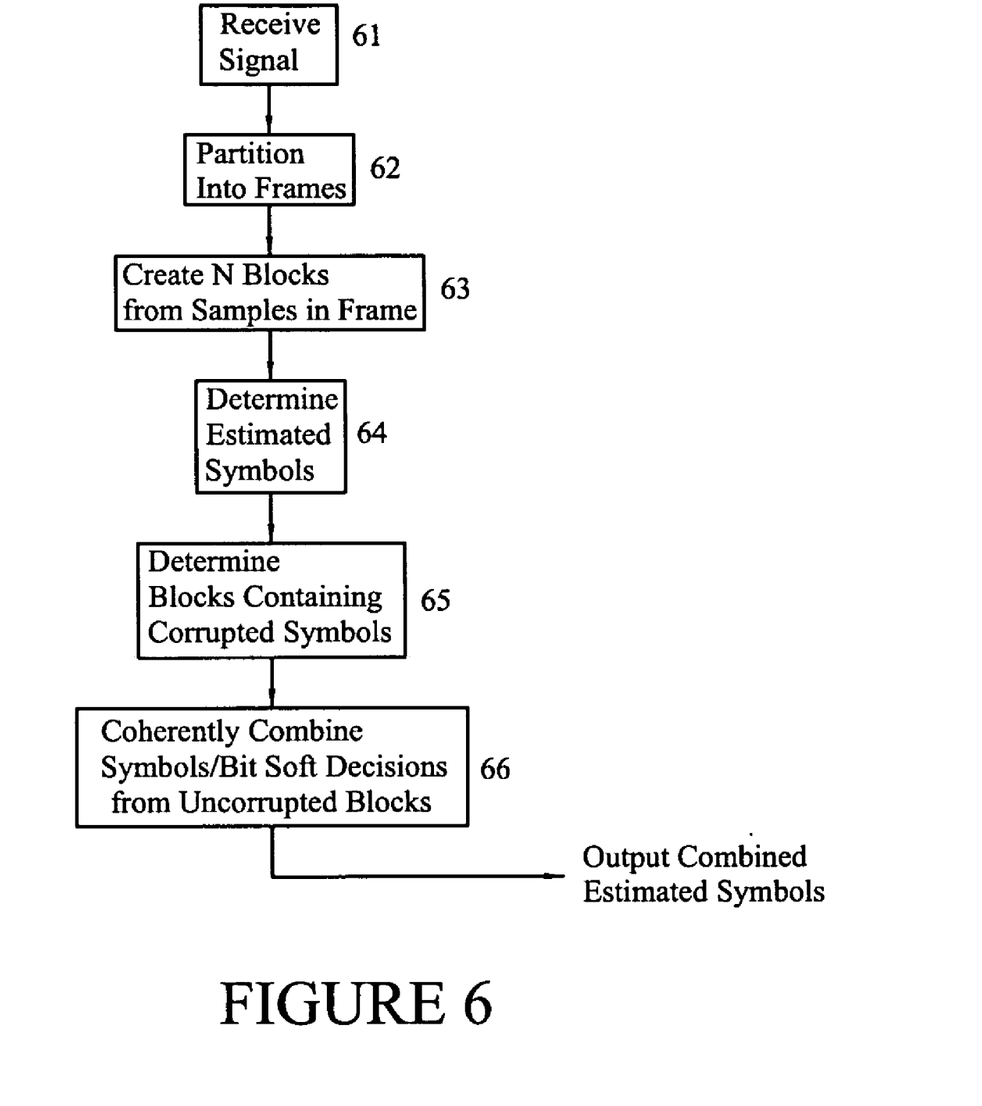
FIG. 6 is a depiction of blocks of samples derived from a received frame including a payload portion and a guard time portion according to the present disclosure.

With reference now to FIG. 6, a flow chart of the major steps performed by a receiver according to the present disclosure is shown. The signal is received at block 61 and partitioned into frames in block 62. In block 63, N blocks of samples are created from the samples in the received frame and in block 64 estimated symbols or bits are determined for each of the N blocks of samples. As discussed above, the N blocks of samples may be created with equal or unequal offsets between successive blocks of samples. In block 65, a determination of which of the N blocks contains estimated symbols or bits corrupted by multipath interference is made and in block 66, the symbols or bits in uncorrupted blocks are coherently added and the combined estimated symbols or bits are output thereby advantageously using the energy in the guard time samples.

Figure 7:
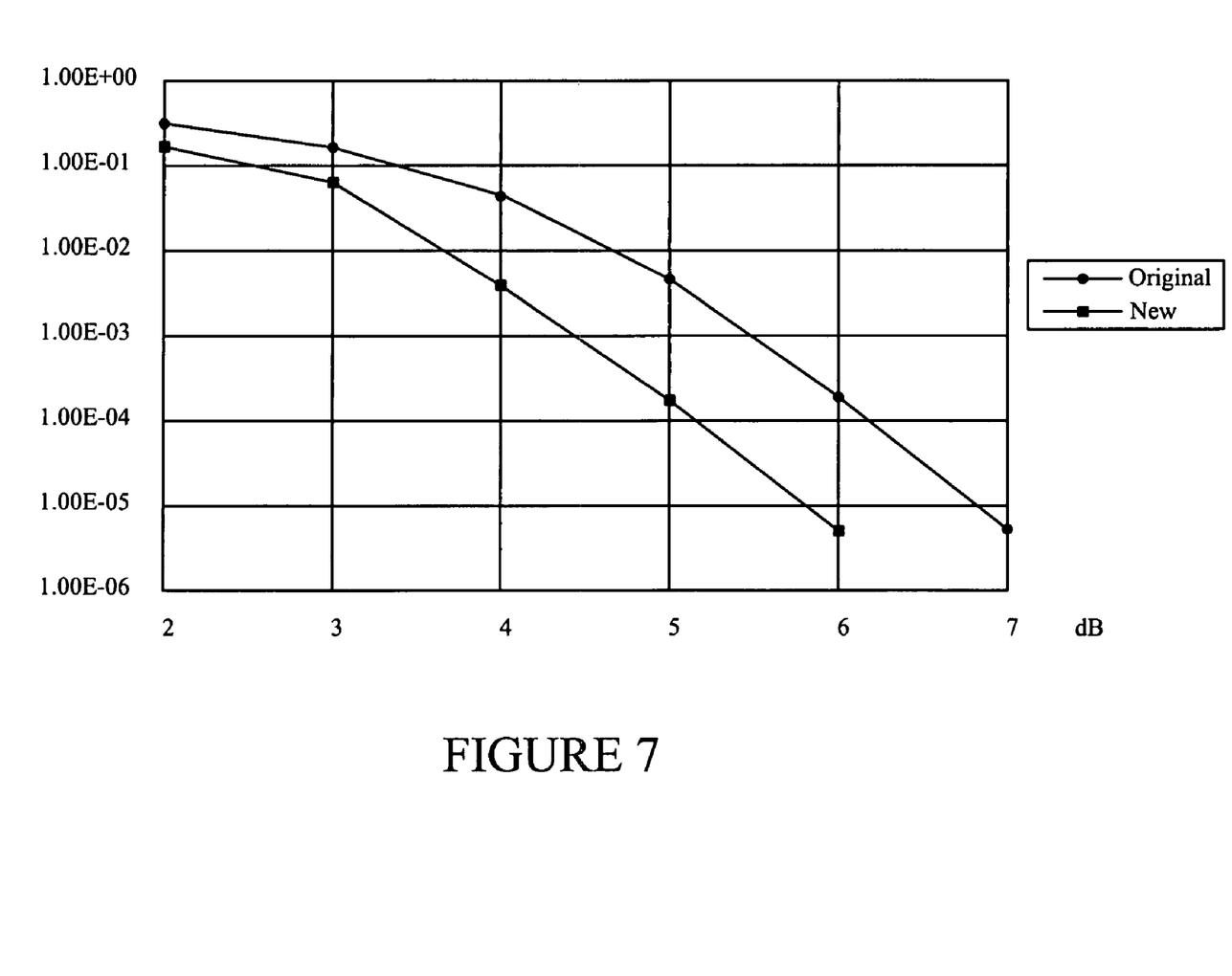
FIG. 7 is a graph showing the simulated performance of an OFDM receiver according to the present disclosure operating in an Additive White Gaussian Noise channel.

FIG. 7 is a graph showing the simulated performance of an OFDM receiver according to the present disclosure operating in an Additive White Gaussian Noise channel. For this simulation, the sample rate is 16,384,000 samples/sec; the OFDM frame size is 6144 samples; the FFT size is 4096 samples; the guard time is 2048 samples; and number of tones is 1216; and the modulation on each tone is DQPSK. As can be seen in FIG. 7, the performance of the receiver is improved by over 1 dB.

Figure 8:
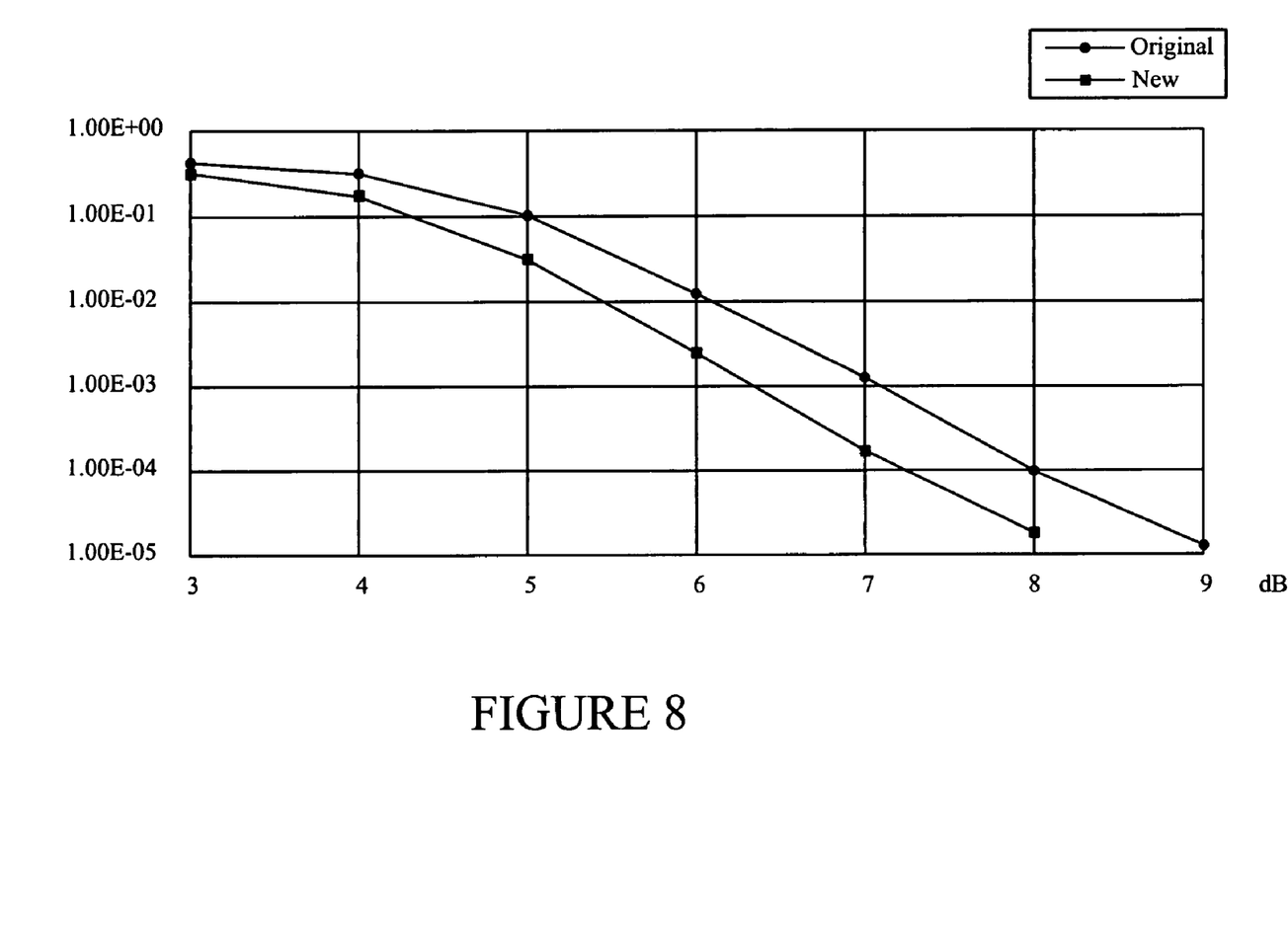
FIG. 8 is a graph showing the simulated performance of an OFDM receiver for a 2-path (equal power per path, no fading) channel separated by 60 microseconds, according to the present disclosure.

FIG. 8 is a graph showing the simulated performance of an OFDM receiver for a 2-path (equal power per path, no fading) channel separated by 60 microseconds, according to the present disclosure. The parameters for this simulation are the same as for the simulation in FIG. 7. As can be seen in FIG. 8, the performance of the receiver is improved by approximately 0.6 dB.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal thereof.

What is claimed is:

1. A method for providing data bits from a received signal comprising frames containing a first predetermined number of samples, comprising the steps of:

(a) for at least one of said frames, creating N blocks of a second predetermined number of samples in said frame;
(b) for at least one of said N blocks, determining if said block is corrupted;
(c) for at least one of said N blocks, determining estimated symbols from the samples in said block; and
(d) coherently combining the estimated symbols in a predetermined number of said N blocks that are not corrupted to thereby provide said data bits.

2. The method of claim 1 wherein the received signal is subject to intersymbol interference.

3. The method of claim 1 wherein the received signal is subject to multipath interference.

4. The method of claim 1 wherein said received signal is an orthogonal frequency division multiplexed signal.

5. The method of claim 1 wherein the step of determining estimated symbols includes performing a Fast Fourier Transform ("FFT").

6. The method of claim 5 wherein the number of samples in each of said N blocks is a function of the size of the FFT.

7. The method of claim 1 wherein the step of determining if said block is corrupted includes using a multipath estimator.

8. The method of claim 1 wherein at least one of said frames includes a guard band.

9. The method of claim 8 wherein said guard band comprises a copy of a third predetermined number of samples ("J") in said frame.

10. The method of claim 9 wherein the third predetermined number of samples is a function of an amount of multipath interference for which said received signal is expected to be subjected.

11. The method of claim 10 wherein N is an integer less than or equal to said third predetermined number of samples.

12. The method of claim 9 wherein the step of creating N blocks of said second predetermined number of samples comprises the steps of:
(i) determining a fourth predetermined number of samples ("K") to be included in each of said N blocks;
(ii) creating a first one of said N blocks comprising the first K samples in said frame;
(iii) creating one of said N blocks comprising K samples whereby the first K sample is J/(N−1) samples after the first sample of the previously created block of samples; and
(iv) repeating step (iii) until step (iii) has been performed a total of N-1 times.

13. The method of claim 12 wherein for step (iii), the K samples are other than the first K samples in said frame.

14. The method of claim 12 wherein for step (iii), the first K sample in at least one of said N blocks is other than J/(N−1) after the first K sample in the previously created block of samples.

15. The method of claim 1 wherein said estimated symbols are bit soft decisions.

16. A method for providing data bits from a received orthogonal frequency division multiplexed signal wherein said signal was transmitted through a channel subject to multipath interference, comprising the steps of:
(a) partitioning the received signal into frames each comprising a predetermined number of received time domain samples representative of received frequency domain symbols;
(b) for at least one of said frames, creating N blocks of the received samples such that each received sample is included in at least one of said N blocks;
(c) for at least one of said N blocks:
(i) determining if said block is corrupted by multipath interference;
(ii) determining estimated frequency domain symbols from the received samples in said block; and
(d) coherently combining the estimated symbols in the N blocks that are not corrupted by multipath interference to thereby provide said data bits.

17. The method of claim 16 wherein the received signal is subject to intersymbol interference.

18. The method of claim 16 wherein the step of determining estimated frequency domain symbols includes performing a Fast Fourier Transform ("FFT").

19. The method of claim 18 wherein the number of samples in each of said N blocks is a function of the size of the FFT.

20. The method of claim 16 wherein the step of determining if said block is corrupted includes using a multipath estimator.

21. The method of claim 16 wherein at least one of said frames includes a guard band.

22. The method of claim 21 wherein said guard band comprises a copy of a predetermined number of samples ("J") in said frame.

23. The method of claim 22 wherein the predetermined number of samples is a function of the expected amount of multipath interference in said channel.

24. The method of claim 23 wherein N is an integer less than said predetermined number of samples.

25. The method of claim 22 wherein the step of creating N blocks of the received samples comprises the steps of:
(i) determining a number of samples ("K") to be included in each of said N blocks;
(ii) creating a first one of said N blocks comprising the first K samples in said frame;
(iii) creating one of said N blocks comprising K samples whereby the first K sample is J/(N−1) samples after the first K sample of the previously created block of samples; and
(iv) repeating step (iii) until step (iii) has been performed a total of N−1 times.

26. The method of claim 25 wherein for step (iii), the K samples are other than the first K samples in said frame.

27. The method of claim 25 wherein for step (iii), the first K sample in at least one of said N blocks is other than J/(N−1) after the first K sample in the previously created block of samples.

28. The method of claim 16 wherein said estimated symbols are bit soft decisions.

29. In a method for determining data bits from a received signal containing symbols in frames wherein said signal was transmitted through a channel subject to multipath interference, wherein said method includes the steps of:
(a) partitioning the signal into frames each comprising a first and a second set of samples; and
(b) determining for at least one of the frames said data bits from said first set of samples;
the improvement comprising the steps of:
(i) for at least one of said frames, creating N blocks of samples such that each sample in the first and second set of samples is a member of at least one of said N blocks;
(ii) for at least one of said N blocks:
(A) determining if said block is corrupted by multipath interference;
(B) determining estimated symbols from the first and second set of samples in said block; and (iii) coherently combining the estimated symbols in the N blocks that are not corrupted by multipath interference to thereby determine said data bits.

30. The method of claim 29 wherein said received signal is an orthogonal frequency division multiplexed signal.

31. The method of claim 29 wherein the step of determining estimated symbols includes performing a Fast Fourier Transform ("FFT").

32. The method of claim 31 wherein the number of samples in each of said N blocks is a function of the size of the FFT.

33. The method of claim 29 wherein the step of determining if said block is corrupted includes using a multipath estimator.

34. The method of claim 29 wherein said second set of samples comprises a copy of a predetermined number of samples from said first set of samples.

35. The method of claim 34 wherein the predetermined number of samples is a function of the expected amount of multipath interference in said channel.

36. The method of claim 29 wherein said estimated symbols are bit soft decisions.

37. A receiver for providing data bits from a received signal comprising frames containing a first predetermined number of samples, comprising:
(a) means for creating N blocks of a second predetermined number of samples in a frame;
(b) means for determining if one of said N blocks is corrupted;
(c) means for determining estimated symbols from the samples in one of said blocks; and
(d) means for coherently combining the estimated symbols in a predetermined number of said N blocks that are not corrupted to thereby provide said data bits.

38. The receiver of claim 37 wherein the received signal is subject to intersymbol interference.

39. The receiver of claim 37 wherein said received signal is an orthogonal frequency division multiplexed signal.

40. The receiver of claim 37 wherein the means for determining estimated symbols comprises a Fast Fourier Transform ("FFT") circuit.

41. The receiver of claim 40 wherein the number of samples in each of said N blocks is a function of the size of the FFT.

42. The receiver of claim 37 wherein the means for determining if one of said N blocks is corrupted comprises a multipath estimator.

43. The receiver of claim 37 wherein at least one of said frames includes a guard band.

44. The receiver of claim 43 wherein said guard band comprises a copy of a third predetermined number of samples ("J") in said frame.

45. The receiver of claim 44 wherein said third predetermined number of samples is a function of an amount of multipath interference for which said received signal is expected to be subject.

46. The receiver of claim 45 wherein N is an integer less than or equal to said third predetermined number of samples.

47. The receiver of claim 37 wherein said estimated symbols are bit soft decisions.

48. A system for communicating data bits in a signal comprising frames containing symbols, over a channel subject to multipath interference, comprising:
(a) a transmitter for creating said frames including a payload portion and a guard time portion wherein the samples in said guard time portion are copies of selected samples in said payload portion, and for transmitting said frames; and
(b) a receiver for receiving said frames and determining the data bits from estimated symbols derived from received samples in the payload portion and at least a part of the guard time portion to thereby communicate said data bits.

49. The system of claim 48 wherein said received signal is an orthogonal frequency division multiplexed signal.

50. The system of claim 48 wherein said receiver includes a Fast Fourier Transform circuit.

51. The system of claim 48 wherein said receiver includes a multipath estimator.

52. The system of claim 48 wherein said receiver comprises:
(a) means for receiving said frames;
(b) means for creating N blocks of the received samples in said frame;
(c) means for determining if one of said N blocks is corrupted;
(d) means for determining estimated symbols from the received samples; and
(e) means for coherently combining the estimated symbols in the subset of N blocks that are not corrupted.

53. The system of claim 52 wherein said estimated symbols are bit soft decisions.

* * * * *